Patented Apr. 6, 1943

2,315,973

UNITED STATES PATENT OFFICE 2,315,973

METHOD OF PREPARING CELLULOSE FOR ESTERIFICATION

Carl J. Malm, Rochester, N. Y., assignor to Eastman Kodak Company, Rochester, N. Y., a corporation of New Jersey No Drawing. Application May 9, 1939,
Serial No. 272,677

4 Claims. (Cl. 260—229)

This application relates to the preparation of cellulose for esterification in which the cellulose is treated first with a lower fatty acid containing water, is then subjected to pressure to remove a great part of the pretreating acid and is then treated with substantially anhydrous acid of the same kind followed by another pressure treatment. This invention also includes a cyclic process whereby the acid pressed off may be employed for the pretreatment of a succeeding batch of cellulose to prepare it for esterification.

In the preparation of cellulose esters, it is desirable to give the cellulose a preliminary treatment prior to the esterification to render the cellulose more susceptible to the action of the esterifying reagents. In the making of cellulose acetate, this pretreatment is ordinarily accomplished by presoaking the cellulose with glacial acetic acid for a sufficient time to form a well swollen material. This material may then be treated with acetic anhydride and catalyst, thus promoting its esterification. In the case of the propionic or butyric acid esters of cellulose, either those in which substantially the entire acyl is propionyl or butyryl or in which a high proportion of the acyl is propionyl or butyryl, the pretreatment with acetic acid obviously cannot be used. As substantially anhydrous propionic or butyric acids do not swell cellulose to any appreciable extent, some other method is necessary to prepare the cellulose for esterification. A solution of this problem is presented in Gardner Patent No. 2,113,301 which teaches the incorporation of 5-20% of water with the propionic or butyric acid used in the presoaking. This has been found to satisfactorily prepare the cellulose for esterification, but the amount of anhydride necessary to destroy the water present in the presoaking liquid is considerable. Thus the making of a cellulose ester containing a large proportion of propionyl or butyryl involves considerable expense in accordance with that process. I have found, however, a method by which this process can be utilized without any additional expense because of the presence of water in the pretreatment mixture.

One object of my invention is to provide an effective pretreatment method for cellulose to be used in making cellulose esters having a high propionyl or butyryl content. Another object of my invention is to provide a process of making high propionyl or high butyryl cellulose esters in which the amount of anhydride employed to kill the water present need be no more than that ordinarily used for this purpose. A still further object of my invention is to provide a method which supplies a nicely swollen cellulose for reaction with the esterification reagents.

I have found a pretreatment method which is readily adapted to cyclic operation which assures good activation of the cellulose and economy in operation. I have found that cellulose may be successfully pretreated with a bath essentially consisting of 75-95% of propionic or butyric acid and 25-5% of water, in sufficient amount to thoroughly soak the cellulose. It is preferred that the pre-treatment bath be substantially free of sulfuric acid or other materials which would lower the cuprammonium viscosity of the cellulose. It is also preferred that this bath be free of other organic acids which would complicate the reuse of the propionic and butyric acids, and of contaminating materials which would gum up the cellulose or interfere with the successful operation of the process.

By my process the cellulose is first pretreated with a mixture of 75-95% propionic acid and/or butyric acid and 25-5% water in a similar manner to that described in U. S. Patent No. 2,113,301 of Gardner. In some cases, even with the manufacture of straight cellulose acetate, the cellulose employed is not readily reactive, such as purified wood pulp. In that case, my invention may be employed for pretreating the cellulose using acetic acid and water for the first step. After the cellulose has been presoaked for a sufficient time, the excess liquid is removed by pressure and an amount of anhydrous acid is added which corresponds to the amount retained by the fibers after the removal of the excess. This is followed by a second pressure treatment which removes the same amount of liquid as the first. There results a very readily reactive cellulose containing only a very small amount of water.

The liquids obtained from the two pressings may be mixed together and are suited for the presoaking or activation of a second batch of cellulose of a like amount as the first. My process is particularly adapted for use in the manufacture of cellulose propionate, cellulose butyrate, cellulose acetate propionate, cellulose acetate propionate butyrate, cellulose acetate propionate or cellulose acetate butyrate containing at least 30% of fatty acid groups of 3-4 carbon atoms. It will be found in most presoaking operations that a treatment for four hours at 100° F. is sufficient to thoroughly swell the cellulose. Nevertheless, as this presoaking treatment is not degrading or detrimental to the quality of the cellulose, longer times or higher temperatures may be used without injury to the cellulose. For instance, instead of a temperature of 100° F., any temperature up to 150° F. can very well be employed. If desired, a time longer than four hours can be used. A temperature below 100° F. may be employed but this requires a somewhat longer time depending on how far the temperature is below 100° F. Therefore, because of the shorter time needed, it is preferred in commercial practice to use a temperature of at least approximately 100° F. for the presoaking step. The following examples illustrate my invention:

Example I

One part of refined cotton linters was treated with 10 parts of 90% butyric acid (other 10% being water) for 4 hours at 100° F. At the end of this time, the mass was centrifuged; ½ part of 90% butyric acid remained in the linters. One-half part of 100% butyric acid was added and after thoroughly mixing, the mass was again centrifuged. One-half part of 95% butyric acid remained in the linters or only 2½% of water, based on the weight of the linters.

The pretreated linters were added to a mixture of one part of butyric acid, 4 parts of butyric anhydride and .03 part of sulfuric acid at 50° F. and the reaction was allowed to proceed to a maximum temperature of 85° F. In 10 hours a very clear viscous solution of a substantially, fully esterified cellulose butyrate was obtained, which is ordinarily referred to as a cellulose tributyrate.

The half part of 95% butyric acid removed from the linters during the second centrifuging was added to the 9½ parts obtained from the first centrifuging and the mixture was used for pretreating a subsequent batch of linters of the same amount. If linters having a 2½% moisture content are used, no adjustment of the water content of the pretreating liquid is necessary to maintain the pretreatment cycle. This cycle may be repeated as often as desired.

Example II

Example I was repeated except that a press instead of a centrifuge was employed to remove the acid from the linters. The mass was pressed down so that only ¼ part of 90% butyric acid remained in the linters. ¼ part of 100% butyric acid was added and, after mixing, the mass was pressed again down to a point were only ¼ part of 95% butyric acid remained in the linters. The water content, of the mass based on the weight of the linters, was then only 1¼%. In this case, to avoid adjustment of the water content of the pretreatment liquid, linters of 1¼% moisture content should be employed. If desired, an 80% aqueous butyric acid may be used for the initial presoaking. With the pressing down to ¼ part of liquid per part of cellulose this would still leave only 2½% water in the linters. If desired, the 100% acid can be added in the press after the first pressing, while the linters are still therein.

Thus it may be seen that my invention may be adjusted in accordance with the moisture content of the linters employed to assure a smooth, easily controlled cycle in which there is a minimum loss of anhydride in killing the water present in the activated linters. It may be seen from the above description and the examples that my invention involves the following steps:

1. Presoaking with lower fatty acid of 75–95% concentration, substantially the remainder being water.

2. Subjecting the mass to pressure to remove as much of the presoaking liquid as possible.

3. Adding an amount of anhydrous acid of the same kind approximately corresponding to the amount retained by the fibers.

4. Again subjecting the mass to pressure to remove liquid, preferably to as great a degree as possible. A readily reactive cellulose, containing a small proportion of water, results.

In the cyclic operation of my invention, the liquid removed by pressure in the two instances is mixed together and is substantially the correct amount and the correct concentration to treat another batch of cellulose of the same weight as that first used. For instance in Example I, 9½ parts of 90% acid was removed in the first centrifuging and ½ part of 95% acid was removed in the second centrifuging, thus making 10 parts of 90+% acid suitable for pretreating a new batch of cellulose. The moisture content of the cellulose will mix with the acid so that upon removal from the mass it will be of approximately 90% concentration.

I claim:

1. A method of preparing cellulose for esterification which comprises presoaking one part of the cellulose with six parts of lower fatty acid of approximately 90% strength, substantially the remainder being water at least until activation of the cellulose has occurred, removing approximately 5½ parts of the acid from the cellulose by pressure, adding to the mass an amount of anhydrous acid of the same kind substantially equal to the amount of aqueous acid retained by the cellulose and subjecting to pressure to remove all but one-half part of acid.

2. A method of preparing cellulose for esterification which comprises presoaking one part of the cellulose with six parts of butyric acid of approximately 90% strength, substantially the remainder being water at least until activation of the cellulose has occurred, removing approximately 5½ parts of the acid from the cellulose by pressure, adding to the mass an amount of anhydrous butyric acid substantially equal to the amount of acid retained by the cellulose, and subjecting to pressure to remove all but ½ part of acid.

3. A method of preparing cellulose for esterification which comprises presoaking one part of the cellulose with a relatively large amount of lower fatty acid of 75–95% strength, substantially the remainder being water, at least until activation of the cellulose has occurred, removing all but approximately one-half part of the acid from the cellulose by pressure, mixing into the mass approximately one-half part of anhydrous acid of the same kind as employed initially, and subjecting to pressure to remove all but one-half part of acid.

4. A method of preparing cellulose for esterification which comprises presoaking one part of the cellulose with a relatively large amount of lower fatty acid of approximately 90% strength, substantially the remainder being water, at least until activation of the cellulose has occurred, removing all but approximately one-half part of the acid from the cellulose by pressure, mixing into the mass approximately one-half part of anhydrous acid of the same kind, and subjecting to pressure to remove all but one-half part of acid.

CARL J. MALM.